2,742,360
Patented Apr. 17, 1956

2,742,360

FEED COMPOSITIONS

John Alfred Aeschlimann and Benjamin Tabenkin, Montclair, N. J., assignors to Hoffmann-La Roche Inc., Nutley, N. J., a corporation of New Jersey No Drawing. Application May 24, 1954,
Serial No. 432,021

10 Claims. (Cl. 99—4)

The present invention relates to animal and poultry feeds. More particularly, this invention relates to animal and poultry feeds or feed concentrates containing growth promoting agents.

One embodiment of this invention comprises an animal or poultry feed containing a γ-keto sulfone. A second embodiment comprises an animal or poutry feed containing an antibiotic and a γ-keto sulfone. A third embodiment comprises an animal or poutry feed containing a sulfonamide and a γ-keto sulfone.

It has been found that certain γ-keto sulfones have a growth promoting effect in domesticated animals and fowl such as ruminants, swine and edible fowl. When minor proportions of these compounds are incorporated in feed for chickens, turkeys, calves, pigs and the like, more rapid growth and greater feed efficiency are obtained than can be elicited on conventional diets. The growth stimulating γ-keto sulfones are represented by the formula

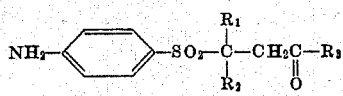

wherein $R_1$ and $R_3$ represent lower alkyl, phenyl or substituted lower alkyl or phenyl groups and $R_2$ represents hydrogen, lower alkyl, phenyl or substittuted lower alkyl or phenyl groups. A preferred group includes those compounds wherein $R_1$ in the above formula represents phenyl, $R_2$ represents hydrogen and $R_3$ represents the same substituents indicated above. The lower alkyl and phenyl substituents in the foregoing formula may be substituted by non-hydrocarbon radicals such as hydroxy, methoxy and the like. The γ-keto sulfones of this invention may be produced by reacting, in a diluent or solvent such as aqueous alcohol, p-aminobenzene sulfinic acid with an unsaturated ketone containing a double bond in the α,β-position to the keto group and which is substituted on the carbon atom β to the keto group, e. g., benzal-acetone, benzal-acetophenone or p-hydroxybenzal-acetophenone.

The growth promoting γ-keto sulfones are stable, substantially water-insoluble compounds which may be incorporated in feed or feed concentrates intended for animals or poultry such as chickens, turkeys, calves, pigs and the like. The compound is intimately admixed with the animal or poultry feed in a proportion of 0.003% to 1%, preferably 0.01% to 0.3%, by weight, based on the final feed composition. Typical feeds with which the growth promoting agent may be admixed are chick starter, broiler and grower feeds, laying mashes, breeder and turkey breeder mashes, turkey starter and grower feeds, pig and sow feeds, hog feeds, hog supplements, cattle feed, calf feed, etc.

Other feed supplements, vitamins and amino acids, for example, may be added to the feed compositions.

The γ-keto sulfones may be incorporated in compositions such as those enumerated above containing antibiotics, e. g. penicillin or its salts, chlorotetracycline, oxytetracycline, bacitracin, etc., for enhanced growth stimulating effect. The proportion of antibiotic to γ-keto sulfone lies within the range of 1 to 10 to 1 to 200 parts by weight. The combined amount of antibiotic and γ-keto sulfone in the fortified feed is 0.01% to 1% by weight, based on the final feed composition. Preferably, the γ-keto sulfones are added to animal and poultry feeds or feed concentrates containing penicillin or its salts. An animal or poultry feed containing 0.001% by weight of procaine penicillin and 0.01% by weight of p-aminophenyl-(2-benzoyl-1-phenyl-ethyl)-sulfone constitutes a preferred feed composition.

According to another embodiment of this invention, the γ-keto sulfones may also be admixed with a sulfonamide-containing animal or poultry feed composition in an amount yielding 0.003% to 1% by weight of combined adjuvant based on the final feed composition.

Example 1

A first premix was formed by thoroughly mixing 50 grams of p-aminophenyl-(2-o-hydroxybenzoyl-1-phenyl-ethyl)-sulfone with 250 grams of a feed composition comprising ground yellow corn, ground whole wheat, soy bean meal, dicalcium phosphate, calcium carbonate, iodized salt, cod liver oil, manganese sulfate quadri-hydrate, niacin, calcium pantothenate, riboflavin, vitamin K, and vitamin $B_{12}$. The 300 grams of first premix thus formed were admixed with an adidtional kilogram of the feed composition to form a second premix. The second premix was then thoroughly blended with additional feed composition to provide 5 kg. of a final fortified poultry feed.

Example 2

A chick mash was produced by blending, in the same manner as in Example 1, 1.5 grams of p-aminophenyl-(2-acetyl-1-phenyl-ethyl)-sulfone with 4,998.5 grams of "Start and Grow" chick mash (manufactured by GLF Feed Co-Operative Mills) comprising whole corn meal, flour midds, soy bean meal, ground oats, meat scrap, distillers solubles, alfalfa meal, dried whey, fish meal, dried skim milk, ground limestone, dicalcium phosphate, riboflavin concentrate, sodium chloride, cod liver oil, delsterol and trace minerals.

Example 3

5 Grams of p-aminophenyl-(2-benzoyl-1-phenyl-ethyl)-sulfone were thoroughly blended, as described in Example 1, with 4,995 grams of the chick mash described in Example 2 to obtain a growth promoting feed composition for baby chicks.

Example 4

A swine feed is prepared by blending, in the same manner as in Example 1, 50 grams of p-aminophenyl-(2-benzoyl-1-phenyl-ethyl)-sulfone with 4,950 grams of a pig and sow formula comprising ground yellow corn, wheat bran, wheat midds, ground whole oats, alfalfa meal, soy bean oil meal, meat scraps, tankage, steamed bone meal, ground limestone and salt.

Example 5

A chick mash was prepared by blending, in the same manner as described in Example 1, 0.05 gram of procaine penicillin, 0.5 gram of p-aminophenyl-(2-benzoyl-1-phenyl-ethyl)-sulfone, and approximately 5,000 grams of "Start and Grow" chick mash, described in Example 2.

We claim:
1. A feed composition containing a compound having the following formula

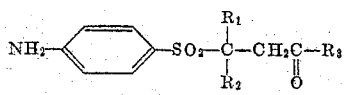

wherein $R_1$ and $R_3$ represent a member of the group consisting of lower alkyl, phenyl, substituted lower alkyl and substituted phenyl groups and $R_2$ represents a member of the group consisting of hydrogen, lower alkyl, phenyl, substituted lower alkyl and substituted phenyl groups.

2. A feed composition as in claim 1 wherein the compound is present in a proportion of 0.003% to 1% by weight.

3. An animal and poultry feed composition as in claim 2.

4. An animal feed composition comprising an animal feed material and a minor proportion of p-aminophenyl-(2-acetyl-1-ethyl)-sulfone.

5. An animal feed composition comprising an animal feed material and a minor proportion of p-aminophenyl-(2-benzoyl-1-phenyl-ethyl)-sulfone.

6. An animal feed composition comprising an animal feed material and a minor proportion of p-aminophenyl-(2-o-hydroxybenzoyl-1-phenyl-ethyl)-sulfone.

7. A feed composition as in claim 1 containing in addition an antibiotic.

8. A feed composition containing a minor proportion of p-aminophenyl-(2-benzoyl-1-phenyl-ethyl)-sulfone and an antibiotic.

9. A feed composition as in claim 8 wherein the antibiotic is penicillin.

10. A feed composition as in claim 1 wherein $R_1$, $R_2$ and $R_3$ each represents a methyl group.

References Cited in the file of this patent

Tabenkin et al.: Reprint from Proceedings of Soc. for Exp. Biol. and Med. (1953), vol. 83, 88–91, received for publication January 29, 1953.